US006477372B1

(12) United States Patent
Otting et al.

(10) Patent No.: US 6,477,372 B1
(45) Date of Patent: Nov. 5, 2002

(54) METHOD FOR A RADIOTELEPHONE TO SCAN FOR ALTERNATE RADIOTELEPHONE SYSTEMS

(75) Inventors: Marcia J. Otting, Mundelein, IL (US); Eric J. Hefner, Grayslake, IL (US); Stephen A. Howell, Barnwood (GB)

(73) Assignee: Motorola, Inc., Schaumburg, IL (US)

( * ) Notice: Subject to any disclaimer, the term of this patent is extended or adjusted under 35 U.S.C. 154(b) by 67 days.

(21) Appl. No.: 09/707,059

(22) Filed: Nov. 6, 2000

(51) Int. Cl.[7] .................................................. H04Q 7/20

(52) U.S. Cl. ..................... 455/434; 455/552; 455/161.1

(58) Field of Search ................................ 455/432, 435, 455/434, 437, 439, 444, 445, 450, 464, 551, 552, 553, 574, 515, 161.1–161.2; 370/400, 401, 402

(56) References Cited

U.S. PATENT DOCUMENTS

| | | | | |
|---|---|---|---|---|
| 4,775,999 A | | 10/1988 | Williams | |
| 5,504,803 A | * | 4/1996 | Yamada et al. | 455/426 |
| 5,623,422 A | | 4/1997 | Williams | |
| 5,870,673 A | * | 2/1999 | Haartsen | 455/426 |
| 5,930,712 A | * | 7/1999 | Byrne et al. | 455/426 |
| 6,041,234 A | * | 3/2000 | Oksanen et al. | 455/434 |
| 6,119,002 A | * | 9/2000 | Alanara | 455/434 |
| 6,119,003 A | * | 9/2000 | Kukkohovi | 455/432 |
| 6,128,489 A | * | 10/2000 | Seazholtz et al. | 370/349 |
| 6,205,334 B1 | * | 3/2001 | Dent | 455/429 |
| 6,215,982 B1 | * | 4/2001 | Trompower | 455/452 |
| 6,240,285 B1 | * | 5/2001 | Blum et al. | 455/404 |
| 6,308,068 B1 | * | 10/2001 | Kunkel | 455/434 |
| 6,324,400 B1 | * | 11/2001 | Shah et al. | 455/426 |

OTHER PUBLICATIONS

GSM 05.08, Digital cellular telecommunications system (Phase 2+); Radio subsystem link control; European Standard (Telecommunication series), v6.7.1.

GSM/ANSI–136 Common Mobile Terminal Specification—Baseline Text, Revision 3; GSM/ANSI 136 Inter operability Team (GAIT); Oct. 26, 1999.

* cited by examiner

*Primary Examiner*—Nay Maung
*Assistant Examiner*—Jean A Gelin
(74) *Attorney, Agent, or Firm*—Brian M. Mancini

(57) ABSTRACT

A method for allowing a radiotelephone to scan for alternate radiotelephone systems, where each cellular radiotelephone system is within a corresponding geographic area and each cell has a base station providing paging and voice communication, includes a first step of registering the radiotelephone on a radiotelephone system. A next step includes establishing whether alternate technology scanning has been enabled for the radiotelephone. If alternate technology scanning is disabled, the radiotelephone receives paging messages from the base station and acknowledges the paging messages addressed to the radiotelephone. If alternate technology scanning is enabled, the radiotelephone scans for an alternate technology while the base station repeats any paging messages addressed to the radiotelephone and ignores a lack of acknowledgement from the radiotelephone for paging messages addressed to the radiotelephone.

13 Claims, 4 Drawing Sheets

MOBILE STATION (MS)
BASE STATION SUBSYSTEM (BSS)
INITIALIZATION
MS CAMPED ON GSM NETWORK
PAGING MESSAGE
MS DETECTS THAT ALTERNATE TECHNOLOGY SCAN IS REQUIRED
MS SWITCHES TO ALTERNATE TECHNOLOGY TO DETERMINE SERVICE AVAILABILITY
PAGING MESSAGE
PAGING MESSAGES ARE NOT RECEIVED BY MS, DUE TO SWITCH TO ALTERNATE TECHNOLOGY
PAGING MESSAGE
MS FINISHES ALTERNATE TECHNOLOGY SCAN AND RETURNS TO GSM
PAGING MESSAGE

METHOD FOR A RADIOTELEPHONE TO SCAN FOR ALTERNATE RADIOTELEPHONE SYSTEMS

FIELD OF THE INVENTION

The present invention relates in general to radiotelephone communication systems, and more particularly to a method for a radiotelephone to scan for alternate radiotelephone systems.

BACKGROUND OF THE INVENTION

As various different types of communication systems have arisen for radiotelephones, it has become beneficial to provide portable and mobile radiotelephone stations that are interoperable between these various communication systems. As a first step, dual-mode phones have been developed that can operate between two radiotelephone systems. For example, the ANSI-136 time division multiple access (TDMA) and GSM (Global System for Mobile Communications) communication systems are intended to work together in the same mobile terminal equipment, as described by the GSM/ANSI-136 Inter operability Team (GAIT) specification, GSM/ANSI-136 Common Mobile Terminal Specification—Baseline Text, Revision 3; GSM/ANSI-136 Inter operability Team (GAIT); Oct. 26, 1999, wherein a mobile radiotelephone is required to scan for alternate technologies. However, no mechanisms are given to do this without service interruptions on the selected technology and no exception cases are described.

The definition of a GAIT mobile station permits a single mobile station to automatically determine the availability of alternate radio access technologies, and thus obtain service on the most desirable radio access technology available in a given location. In particular, the GAIT specifications allow for a mobile station to perform (background) scans of radio access technologies other than the one on which it has currently obtained service. However, there are some system performance issues that degrade the intended behavior of the mobile station on the selected network while these scans of alternate technologies are in progress. Specifically, when a mobile station is operating as a GAIT compliant handset, and has obtained service on a GSM-based (900 MHz, 1800 MHz or 1900 MHz) network, the scan of ANSI-136 technology cannot be done without missing paging messages from the GSM network. This results in a waste of GSM network resources for paging, and unpredictable mobile paging response behavior. In the existing GAIT specifications, there is no mechanism to allow the mobile to perform the alternate technology scans without compromising operation on the GSM network. As a result, a base station sending such paging messages, and receiving no reply in return, may presume that the mobile has been turned off and remove the unit from its active list. The mobile unit, when trying to resume communications will need to reestablish the connection with the base station, wasting time and resources. Also, missing GSM pages wastes resources and has been perceived by operators as providing unpredictable service.

In addition, there is an issue with a standards conflict. For an mobile unit camped onto a GSM network, "The MS is required to attempt to decode a message every time its paging subchannel is sent" per GSM 05.08, "Digital cellular telecommunications system (Phase 2+); Radio Subsystem Link Control", European Telecommunications Standards Institute (ETSI), European Standard (Telecommunications series), v6.7.1, sec. 6.5. However, there is a fundamental contradiction between this and the GAIT specifications, which state that background scans are required, and are to be done "in such a way as to minimize interruptions in the mobile station's monitoring for pages" per GSM/ANSI-136 Common Mobile Terminal Specification—Baseline Text, Revision 3; GSM/ANSI-136 Inter operability Team (GAIT); Oct. 26, 1999, sec. 6.2. One way to address this issue is to use a dual-receiver mobile unit. However this is cost prohibitive due to the additional hardware and processor requirements.

Therefore, the need exists for a method to allow a mobile unit to perform alternate radiotelephone system scans without missing paging messages on the system where it is presently camped. Additionally, it would prove beneficial to provide this performance improvement with relatively simple hardware and software and with little or no additional cost.

DETAILED DESCRIPTION OF THE PREFERRED EMBODIMENT

The present invention provides a method to allow a mobile unit to perform alternate radiotelephone system scans with controllable interruptions to the system where it is presently camped. Additionally, the present invention can be implemented with a single mobile receiver and with relatively simple software modification and no additional hardware, therefore limiting any cost penalty.

Ideally, it would be best for the mobile radiotelephone to perform the alternate technology scan between paging message slots by designing the mobile station to perform pieces of the ANSI-136 band scan in between GSM pages. However, the shortest time allowed between GSM pages, for circuit-switched mode, is 2 multi-frames, or 270 ms. Current software architecture and hardware capabilities do not allow for a switch to an alternate technology in this time frame. Further, when using a general packet radio service (GPRS) in GSM, packet paging messages can arrive constantly (every downlink block) which would make the alternate technology switch virtually impossible, even with updated hardware capabilities.

Allowing for alternate technology scanning provides several advantages. These advantages include, but are not limited to, the following examples. The mobile unit can scan for available higher priority service within another technology. The mobile unit can scan for alternate service within another technology. Scanning can reduce roaming charges. The mobile unit can be required to perform scans due to operator requirements, thereby improving network operations. In addition, different networks can provide different services that can be used beneficially by the mobile unit.

The present invention provides two methods to perform background scans. In a first and preferred method the base station decides when and how long the mobile unit searches for an alternate technology. This is described as a Network Controlled Alternate Technology Scan (NCATS) mechanism. One possible implementation is that the network give the mobile radiotelephone an indication of whether alternate technology service searches are allowed, by sending a bit in an attach message. Further, the network could give an indication of how long the mobile radiotelephone is allowed to be away from the currently camped network. This could be done via the page mode element. This could be done in specific geographical areas, or at certain times, based on available network resources.

Figure 1:
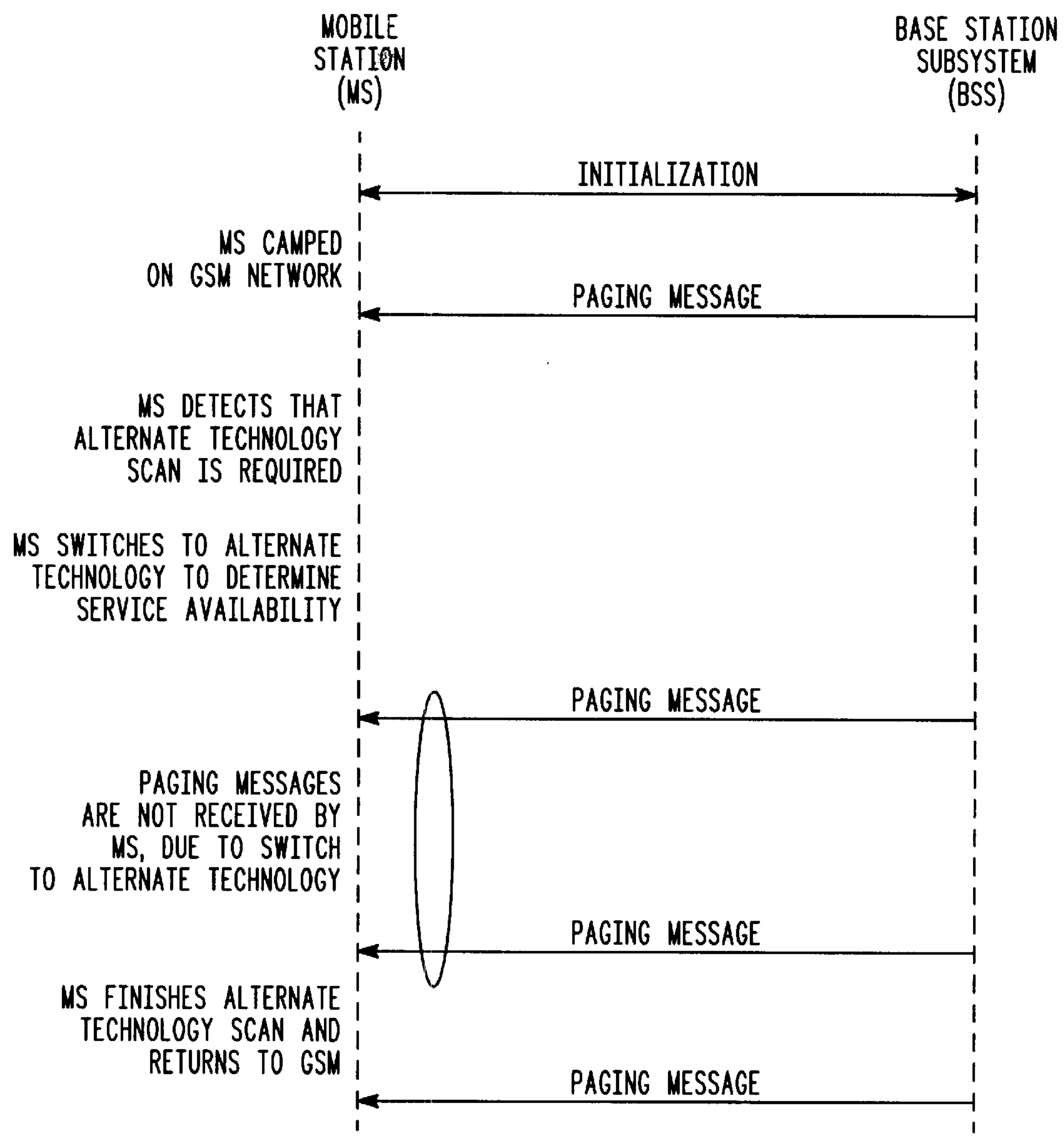
FIG. 1 illustrates the prior art paging interaction between a GSM mobile and a base station.
Figure 2:
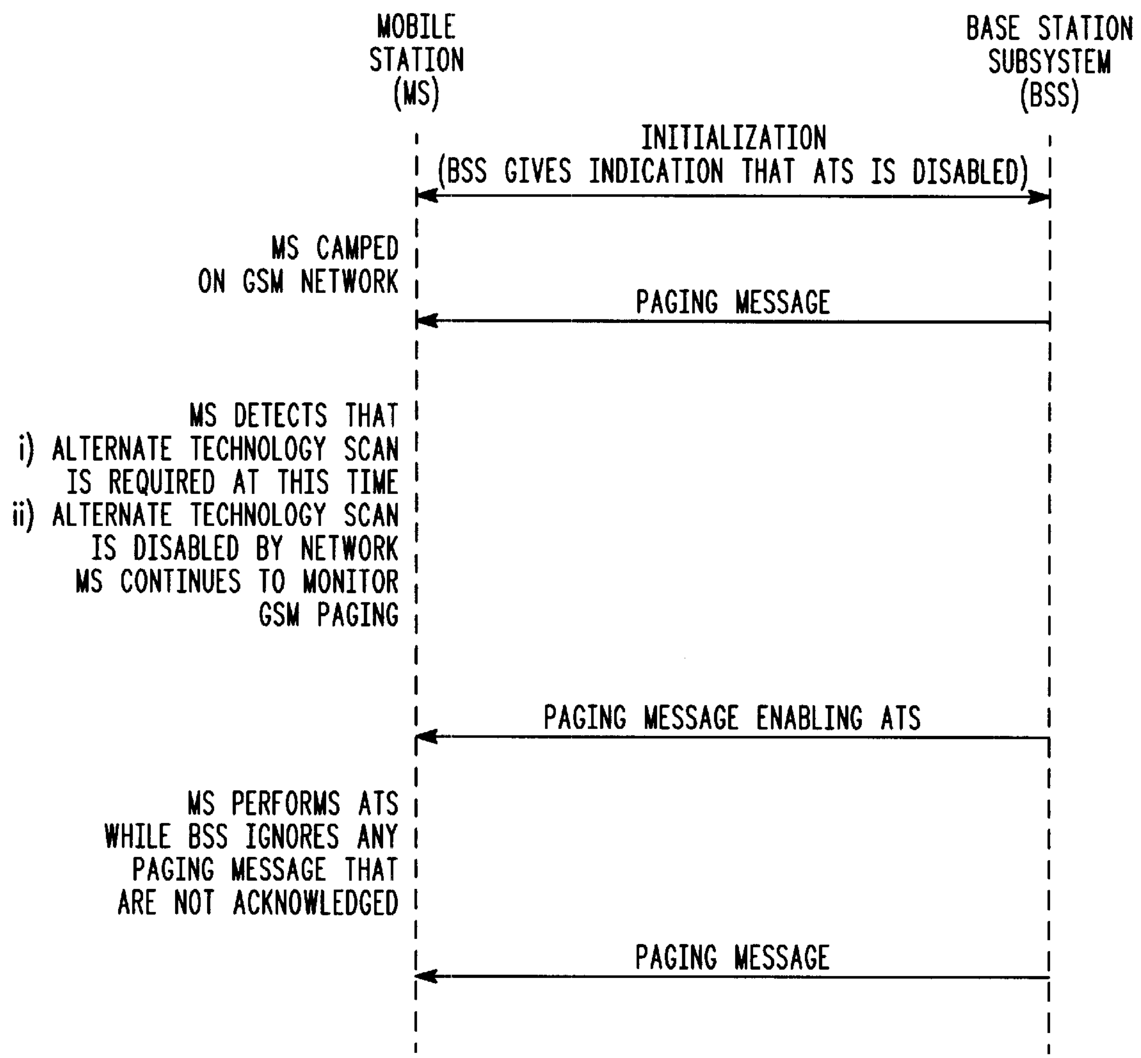
FIG. 2 illustrates the paging interaction between a GSM mobile and a base station, in accordance with the present invention.

With this solution the network gives an indication that the GAIT mobile radiotelephone may skip the background scans. In this way, the network itself could limit the operational impact of a GAIT mobile radiotelephone missing pages and wasting network resources, by limiting the times or locations in which the alternate band scan is performed. FIGS. 1 and 2 show GAIT mobile radiotelephone operation in a present operating mode as is known in the art, and with the preferred embodiment of the present invention, respectively.

In FIG. 1, six steps are shown with time proceeding from top to bottom. In a first step, the mobile station (MS) and base station (BSS) initialize communication with themselves whereupon the mobile is camped on the base station's network (preferably, GSM). The base station in this mode has no control over the mobile performing an alternate technology scan (ATS). In the second step, the base station sends paging messages as in normal operation. In the next step, the mobile unit determines that an ATS is needed and starts this operation. During this time, in the next two steps, the base station sends two paging messages addressed to the mobile unit which are not received by the mobile unit (circled area). In the GSM system, if a page addressed to the mobile unit is not acknowledged the base station will likely re-page the mobile. If a second page is not acknowledged, the base station may remove the mobile unit from its active list, and only pages other active mobile units in the area (last step). When the mobile unit completes its ATS, it does not know that it has been removed from the active list and the base station will no longer address the mobile in paging messages. In this case the mobile unit, to reestablish communication, must re-initialize with the base station.

In FIG. 2, five steps are shown with time proceeding from top to bottom, in accordance with the present invention. In a first step, the mobile station (MS) and base station (BSS) initialize communication with themselves whereupon the mobile is camped on the base station's network (preferably, GSM). The base station in this mode controls the ATS indicator for the mobile unit. At the start, the base station instructs the mobile that ATS is disabled for example, preventing the mobile from doing an ATS when it is indicated. This is preferred since there may be immediate communications needed between units at initialization, although it should be recognized that ATS can be enabled at start up. In the second step, the base station sends paging messages as in normal operation. In the next step, the mobile unit determines that an ATS is needed. However, it does not start ATS until the base station enables it. In a next step the base station pages the mobile enabling ATS. This can be done with one bit coded in the paging message. At this time the mobile begins its ATS. During this time, the base station continues to resend any paging messages addressed to the mobile unit (to properly follow the standard) but does not delete the unacknowledging mobile from its active list understanding that the mobile may be performing an ATS. When the mobile returns from performing ATS, it will be able to again receive paging message in sequence.

It should be recognized that the step of enabling of ATS by the network and the step of the mobile determining that ATS is needed can be reversed without consequence. That is, the base station can enable ATS in the mobile before an ATS is required, and then the mobile can begin ATS when it determines it is required. The above solution can also be applied to a GAIT mobile unit with GPRS capabilities where the network sends the "ATS disabled" during a GPRS attach procedure in addition to, or independent from, sending it during initialization. In addition, it should be recognized that the method of the present invention can also be applied to scanning for more than one alternate technology, using a multimode radiotelephone capable of camping on several different radio technology systems.

Figure 3:
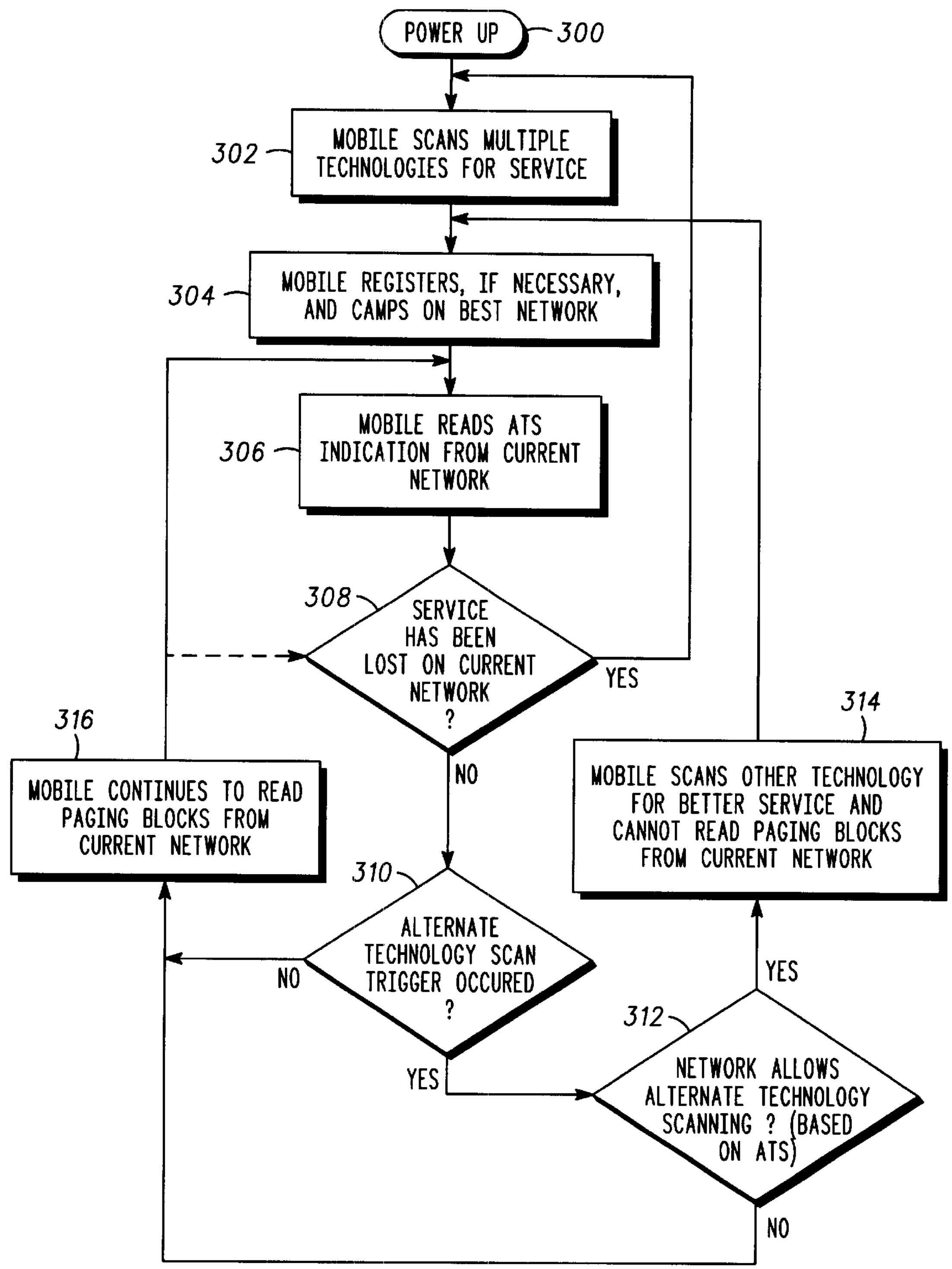
FIG. 3 illustrates a flow chart of an alternate technology scan operation of a mobile unit, in accordance with a preferred embodiment of the present invention.

The preferred embodiment of the method of the present invention can be further understood with reference to FIG. 3. At power up 300, the mobile radiotelephone proceeds to scan 302 for service in the multiple radio technologies in which the radiotelephone is capable. When the mobile has completed its scan, it registers, if necessary, and camps 304 on the best available network. At this point, the mobile radiotelephone reads, from the current base station cell it is camped in, whether it has been enabled 306 to perform alternate technology scanning. In addition, the radiotelephone begins its normal reception and response or acknowledgement to paging messages. During operation, the radiotelephone normally detects 308 whether it has lost service on its current network. If this occurs, the radiotelephone will reset as in its power up state 300 and scan 302 for another service technology that may be available. However, assuming service is never lost, the mobile will perform normally until an alternate technology scan (ATS) is triggered 310. If an ATS is not yet triggered, the mobile radiotelephone will continue with its normal monitoring of paging blocks from the current network 316 while also monitoring for lost service 308.

After an ATS is triggered 310, and if the network has enabled ATS in the radiotelephone 312, the mobile radiotelephone can then scan 314 for alternate technologies while ignoring paging messages in the technology where it is currently camped. In addition, while the mobile unit is scanning, the base station sends its paging messages as normal, but now ignores any lack of acknowledgement from the radiotelephone for pages addressed to the mobile unit. During this time the base station keeps the radiotelephone on its active list. If the mobile unit finds a desired technology service, it must necessarily register and camp 304 on the new network. If this is the case, the base station will implicitly disconnect the mobile from the previous network. For example, the base station can repage the mobile unit a predetermined number of times or for a predetermined time, transferring to voice mail for example, if necessary. Moreover, the base station will no longer receive calls for the mobile since the mobile will be initialized on the new network. However, in the case where the mobile unit finds that there is no available alternate service, the mobile unit stays camped 304 on its existing network.

However, if the network has disabled ATS in the radiotelephone 312, and after ATS is triggered 310 in the mobile, the mobile radiotelephone is forced to continue with its normal monitoring of paging blocks from the current network 316 while also monitoring for ATS 306 and for lost service 308. The ATS enabling status is broadcast continually by the network in the system information messages. The network can enable or disable ATS at any time. Therefore, the mobile unit will routinely monitor for ATS enablement 306. Alternatively, a system can be set up where the base station makes a one time decision to enable or disable ATS 306, and the mobile unit will only monitor paging blocks from the current network 316 while also monitoring for lost service 308.

Specifically, the present invention is a method for allowing a radiotelephone to scan for alternate radiotelephone systems where each radiotelephone system has a plurality of cells for providing radiotelephone service to a radiotelephone within a corresponding geographic area. Each cell includes paging and voice communication and a radio coverage area established by fixed site base stations. Each base station is operable to send paging messages to radiotelephones and receive acknowledgements therefrom. Initially, it is preferred that the method includes first steps of powering up the radiotelephone and scanning for available alternate technologies for service. It is always desired to search all available technologies to find the one with the best available service. The method includes a next step of registering and camping the radiotelephone on a (preferably GSM) radiotelephone system. A next step includes establishing whether alternate technology scanning has been enabled for the radiotelephone. As a next step, If alternate technology scanning is disabled the radiotelephone receives and acknowledges paging messages as they are received from the base station. However, if alternate technology scanning is enabled the radiotelephone scans for an alternate technology (preferably ANSI-136) while the base station concurrently repeats any paging messages to the radiotelephone during performance of the scanning step. It is also preferred to scan for an alternately technology if service has been lost on the current network. In addition, during this time while ATS is enabled the base station ignores a lack of acknowledgement from the radiotelephone. Preferably, the base station retains the radiotelephone on an active list during this time.

In an alternate method of the present invention, the mobile radiotelephone skips the background scans in certain limited scenarios, in such a way that the principle of a GAIT compliant MS is not compromised. This embodiment is described as a Mobile Controlled Alternate Technology Scan (MCATS) mechanism where the mobile radiotelephone (either automatically or via user or operator option) determines whether or not the mobile radiotelephone searches for alternate technology service when obtaining service on a certain network type. This feature could be adapted based on those network types where a customer would want to trigger the alternate technology scans.

For example, when the feature is "ON", the mobile radiotelephone itself would detect the presence of a certain GSM network type, and then switch on or off the alternate technology scans appropriately. This mobile control mechanism could be a user feature, a flexed feature, or a feature of a subscriber identification module (SIM). For example, in a mobile radiotelephone with the MCATS feature "ON", if the mobile radiotelephone is operating in GSM1800 or GSM900 coverage areas (such as in Europe), the mobile radiotelephone would not perform the alternate technology scans. If the same mobile radiotelephone was operating in GSM1900 coverage area (such as in North America), the mobile radiotelephone would perform the alternate technology scans. This could be useful for a tri-band GSM (900 MHz, 1800 MHz and 1900 MHz) GAIT mobile radiotelephone used in European markets, and would still allow the mobile radiotelephone to be used as a GAIT mobile radiotelephone in the North American markets, where the alternate technology scans are more desirable. Making this function a SIM feature would allow the North American operators control over the use of the mobile radiotelephone in the their network areas, while not compromising GSM service in Europe, where GSM900 and GSM1800 networks are present. Alternatively, the mobile unit, upon initialization, can tell what country it is operating in and, with stored knowledge of what systems are available in that country, the mobile can turns ATS on or off as needed.

Figure 4:
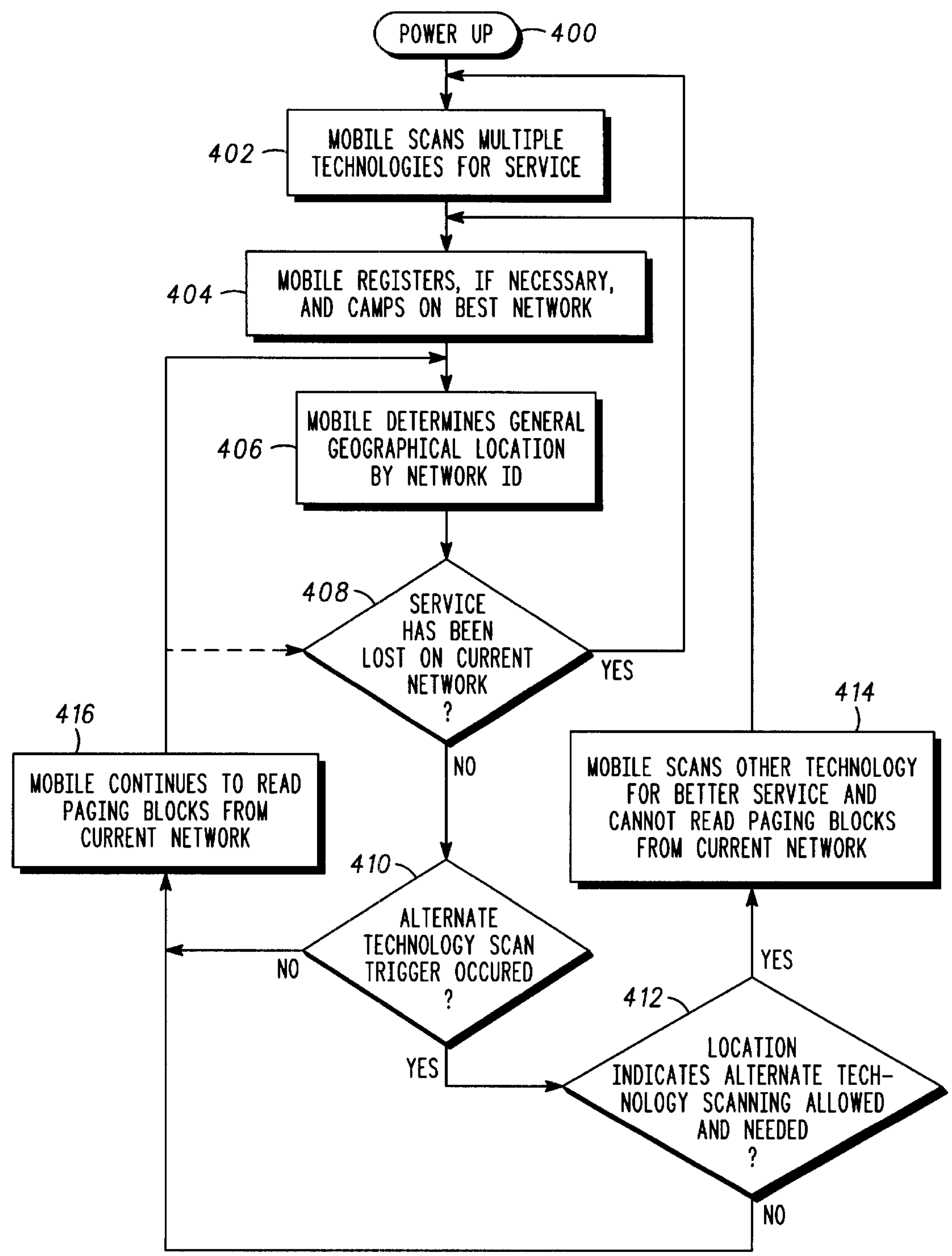
FIG. 4 illustrates a flow chart of an alternate technology scan operation of a mobile unit, in accordance with an alternate embodiment of the present invention.

For this alternate embodiment, the method of the present invention can be further understood with reference to FIG. 4. At power up 400, the mobile radiotelephone proceeds to scan 402 for service in the multiple radio technologies in which the radiotelephone is capable. When the mobile has completed its scan, it registers, if necessary, and camps 404 on the best available network. At this point, the mobile radiotelephone determines 406 the country code or general geographic location from the available network identification. In addition, the radiotelephone begins its normal reception and response or acknowledgement to paging messages. During operation, the radiotelephone normally detects 408 whether it has lost service on its current network. If this occurs, the radiotelephone will reset, as in its power up state 400, and scan 402 for another service technology that may be available. However, assuming service is never lost, the mobile will perform normally until an alternate technology scan (ATS) is triggered 410. Triggering can occur by a timer expiring or by manual user intervention, for example. If an ATS is not yet triggered, the mobile radiotelephone will continue with its normal monitoring of paging blocks from the current network 416 while also monitoring for lost service 408.

After an ATS is triggered 410, and if the location of the network indicates that ATS is available, the mobile radiotelephone can then scan 414 for alternate technologies while ignoring paging messages in the technology where it is currently camped. In addition, while the mobile unit is scanning, the base station repeats its paging messages as normal. If the mobile unit finds an alternate technology service, it must necessarily register and camp 404 on the new network. In this case, the base station will repage the mobile unit a predetermined number of times or for a predetermined time, transferring to voice mail or dropping the call for example, if necessary. If the mobile finds that there is no alternate service, the mobile unit stays camped 404 on its existing network.

However, if the location of the network indicates that ATS is not allowed, the mobile radiotelephone will continue with its normal monitoring of paging blocks from the current network 416 while also monitoring for lost service 408.

The present invention provides particular advantages in that North American ANSI-136 and GSM operators are looking forward to the availability of mobile stations capable of selecting the best available network type among different technology networks. These features will provide a way for European operators to use these same mobile stations while minimizing the impact on their networks. This technology could also potentially be applied to other types of multimode terminals, for example, those with both W-CDMA and GSM capability.

While the invention has been described in the context of a preferred embodiment, it will be apparent to those skilled in the art that the present invention may be modified in numerous ways and may assume many embodiments other than that specifically set out and described above. Accordingly, it is intended by the appended claims to cover all modifications of the invention which fall within the broad scope of the invention.

What is claimed is:

1. A method for allowing a radiotelephone to scan for alternate radiotelephone systems using a single receiver, each radiotelephone system having a plurality of cells for providing radiotelephone service to a radiotelephone within a corresponding geographic area, each cell having paging and voice communication and a radio coverage area established by fixed site base stations, and each base station operable to send paging messages to radiotelephones, the method comprising the steps of:

registering the radiotelephone on a radiotelephone system by a base station;

establishing by the base station whether to enable alternate technology scanning for the radiotelephone; and if alternate technology scanning is disabled:

the radiotelephone receiving paging messages from the base station;

the radiotelephone acknowledging to the base station paging messages addressed to the radiotelephone;

if alternate technology scanning is enabled;

the radiotelephone scanning for an alternate technology;

the base station concurrently repeating any paging messages addressed to the radiotelephone during performance of the scanning step;

the base station ignoring a lack of acknowledgement from the radiotelephone for paging messages addressed to the radiotelephone.

2. The method of claim 1, wherein before the registering step, further comprising the steps of powering up the radiotelephone, and scanning for available alternate technologies for service.

3. The method of claim 1, wherein after the establishing step, further comprising a step of detecting if service has been lost on the current network whereupon continuing at the previous scanning step.

4. The method of claim 1, wherein the registering step includes registering on one of a GSM radiotelephone system and a ANSI-136 radiotelephone system.

5. The method of claim 4, wherein the scanning step includes an alternate technology including at least one of a ANSI-136 radiotelephone system and a GSM radiotelephone system.

6. The method of claim 1, wherein the ignoring step includes the base station retaining the radiotelephone on an active list.

7. A method for allowing a radiotelephone to scan for alternate radiotelephone systems using a single receiver, each radiotelephone system having a plurality of cells for providing radiotelephone service to a radiotelephone within a corresponding geographic area, each cell having paging and voice communication and a radio coverage area established by fixed site base stations, and each base station operable to send paging messages to radiotelephones, the method comprising the steps of:

powering up the radiotelephone;

scanning for available technologies for service;

registering and camping the radiotelephone on a preferred radiotelephone system;

establishing by the radiotelephone system whether to enable alternate technology scanning for the radiotelephone; and if alternate technology scanning is disabled:

the radiotelephone receiving paging messages from the base station;

the radiotelephone acknowledging to the base station paging messages addressed to the radiotelephone;

if alternate technology scanning is enabled;

the radiotelephone scanning for an alternate technology for service;

the base station concurrently repeating any paging messages addressed to the radiotelephone during performance of the scanning step;

the base station ignoring a lack of acknowledgement from the radiotelephone for paging messages addressed to the radiotelephone and retaining the radiotelephone on an active list.

8. The method of claim 7, wherein after the establishing step, further comprising a step of detecting if service has been lost on the current network whereupon continuing at the previous scanning step.

9. The method of claim 7, wherein the registering step includes registering on one of a GSM radiotelephone system and a ANSI-136 radiotelephone system.

10. The method of claim 9, wherein the scanning step includes an alternate technology including at least one of a ANSI-136 radiotelephone system and a GSM radiotelephone system.

11. A method for allowing a radiotelephone to scan for alternate radiotelephone systems using a single receiver, each radiotelephone system having a plurality of cells for providing radiotelephone service to a radiotelephone within a corresponding geographic area, each cell having paging and voice communication and a radio coverage area established by fixed site base stations, and each base station operable to send paging messages to radiotelephones, the method comprising the steps of:

powering up the radiotelephone;

scanning for available technologies for service;

registering and camping the radiotelephone on a preferred radiotelephone system;

establishing by the radiotelephone system whether to enable alternate technology scanning for the radiotelephone;

detecting if service has been lost on the current network whereupon continuing at the previous scanning step; and if alternate technology scanning is disabled:

the radiotelephone receiving paging messages from the base station;

the radiotelephone acknowledging to the base station paging messages addressed to the radiotelephone;

if alternate technology scanning is enabled;

the radiotelephone scanning for an alternate technology for service;

the base station concurrently repeating any paging messages addressed to the radiotelephone during performance of the scanning step;

the base station ignoring a lack of acknowledgement from the radiotelephone for paging messages addressed to the radiotelephone and retaining the radiotelephone on an active list.

12. The method of claim 11, wherein the registering step includes registering on a GSM radiotelephone system.

13. The method of claim 12, wherein the scanning step includes an alternate technology including at least an ANSI-136 radiotelephone system.

* * * * *